US010050460B2

(12) United States Patent
Li et al.

(10) Patent No.: US 10,050,460 B2
(45) Date of Patent: Aug. 14, 2018

(54) MOBILE TERMINAL, DC-CHARGING POWER SOURCE ADAPTOR, AND CHARGING METHOD

(71) Applicant: HISENSE MOBILE COMMUNICATIONS TECHNOLOGY CO., LTD., Qingdao (CN)

(72) Inventors: Chunqian Li, Qingdao (CN); Naifeng Zhang, Qingdao (CN); Wenjuan Du, Qingdao (CN); Maoxue Yu, Qingdao (CN)

(73) Assignees: HISENSE MOBILE COMMUNICATIONS TECHNOLOGY CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 227 days.

(21) Appl. No.: 15/051,799

(22) Filed: Feb. 24, 2016

(65) Prior Publication Data
US 2017/0040812 A1 Feb. 9, 2017

(30) Foreign Application Priority Data
Aug. 5, 2015 (CN) .......................... 2015 1 0473336

(51) Int. Cl.
H02J 7/00 (2006.01)
H04B 1/3827 (2015.01)
H02J 7/02 (2016.01)

(52) U.S. Cl.
CPC .......... *H02J 7/0072* (2013.01); *H02J 7/0052* (2013.01); *H02J 7/02* (2013.01); *H04B 1/3827* (2013.01);

(Continued)

(58) Field of Classification Search
USPC ....................................................... 320/114
See application file for complete search history.

(56) References Cited

U.S. PATENT DOCUMENTS 7,528,574 B1 5/2009 Adkins et al.
9,197,086 B2 11/2015 Zhou et al.
(Continued)

FOREIGN PATENT DOCUMENTS

CN 201590668 U 9/2010
CN 102570546 A 7/2012
(Continued)

OTHER PUBLICATIONS

Office Action from related Chinese Application No. 201510473429.7 dated Dec. 8, 2016 (9 pages).
(Continued)

Primary Examiner — Mohammed Alam
(74) Attorney, Agent, or Firm — Harness, Dickey & Pierce, P.L.C.

(57) ABSTRACT

This disclosure provides a mobile terminal, a DC-charging power source adaptor, and a charging method, where firstly the DC-charging power source adaptor is configured to communicate with the mobile terminal in a UART communication mode, and then a strategy to identify the type of charging is designed in the mobile terminal dependent upon configuration of communication pins of a different charging device, so that the mobile terminal identifies automatically the type of the external device. Also a specialized rapid charging mode is designed for the DC-charging power source adaptor, the battery of the mobile terminal being charged is DC-charged at large current by charging voltage output by the DC-charging power source adaptor, and the volt value of the charging voltage is adjusted dynamically according to the varying voltage of the battery.

6 Claims, 8 Drawing Sheets

(52) U.S. Cl.
CPC ............. *H02J 2007/0062* (2013.01); *H02J 2007/0096* (2013.01)

(56) References Cited

U.S. PATENT DOCUMENTS

| | | | |
|---|---|---|---|
| 9,300,159 | B2 | 3/2016 | Sun et al. |
| 2005/0001590 | A1 | 1/2005 | Bayne et al. |
| 2007/0188134 | A1 | 8/2007 | Hussain et al. |
| 2008/0061733 | A1 | 3/2008 | Toya |
| 2008/0100143 | A1 | 5/2008 | Lipcsei |
| 2009/0184687 | A1 | 7/2009 | Schroeder et al. |
| 2010/0115147 | A1* | 5/2010 | Kim .............. H04M 1/6058 710/14 |
| 2011/0279078 | A1 | 11/2011 | Hara et al. |
| 2014/0015507 | A1 | 1/2014 | Park et al. |
| 2014/0167706 | A1 | 6/2014 | Sun et al. |
| 2014/0203761 | A1 | 7/2014 | Paparrizos et al. |
| 2016/0094084 | A1 | 3/2016 | Sotani et al. |
| 2016/0214500 | A1 | 7/2016 | Kim et al. |
| 2016/0261127 | A1* | 9/2016 | Worry .............. G01R 31/3624 |
| 2016/0336779 | A1* | 11/2016 | Hu .................... H02J 7/0052 |
| 2016/0352132 | A1 | 12/2016 | Zhang et al. |
| 2017/0040804 | A1* | 2/2017 | Hu ..................... H02J 7/022 |
| 2017/0040805 | A1 | 2/2017 | Huang et al. |
| 2017/0040810 | A1* | 2/2017 | Hu .................... H02J 7/0036 |
| 2017/0040812 | A1* | 2/2017 | Li ..................... H02J 7/0044 |
| 2017/0066342 | A1 | 3/2017 | Butler et al. |

FOREIGN PATENT DOCUMENTS

| | | |
|---|---|---|
| CN | 103236568 A | 8/2013 |
| CN | 103872398 A | 6/2014 |
| CN | 104393627 | 3/2015 |
| CN | 104701937 | 6/2015 |
| CN | 102880238 B | 7/2015 |
| CN | 104796011 A | 7/2015 |
| JP | 2007089309 A | 4/2007 |
| JP | 2007267498 | 10/2007 |
| WO | 2012086788 | 6/2012 |

OTHER PUBLICATIONS

Office Action from related Chinese Application No. 201510473429.7 dated Aug. 1, 2017 (8 pages).
Office Action from related Chinese Application No. 201510473427.8 dated Oct. 27, 2016 (8 pages).
Office Action from related Chinese Application No. 201510473427.8 dated May 17, 2017 (8 pages).
Office Action from related Chinese Application No. 201510473321.8 dated Oct. 8, 2016 (4 pages).
Office Action from related Chinese Application No. 201510473321.8 dated Jun. 15, 2017 (5 pages).
Office Action from related Chinese Application No. 201510473321.8 dated Sep. 26, 2017 (5 pages).
U.S. Appl. No. 15/052,007, filed Feb. 24, 2016, Huang et al.
U.S. Appl. No. 15/062,658, filed Mar. 7, 2016, Li et al.
U.S. Appl. No. 15/076,832, filed Mar. 22, 2016, Li et al.
Office Action from Chinese Application No. 201510473328.X dated Nov. 1, 2016 (6 pages).
Office Action from Chinese Application No. 201510473328.X dated Jun. 13, 2017 (3 pages).
U.S. Appl. No. 15/051,851, filed Feb. 24, 2016, Ermeng Hu et al.

* cited by examiner

MOBILE TERMINAL, DC-CHARGING POWER SOURCE ADAPTOR, AND CHARGING METHOD

CROSS-REFERENCE TO RELATED APPLICATION

This application claims the benefit and priority of Chinese Patent Application No. 201510473336.4 filed Aug. 5, 2015. The entire disclosure of the above application is incorporated herein by reference.

FIELD

The present disclosure relates to the field of Direct-Current (DC) charging and particularly to a method for charging a battery in a mobile terminal, and a mobile terminal and DC-charging power source adaptor supporting the charging method.

BACKGROUND

This section provides background information related to the present disclosure which is not necessarily prior art.

At present, portable mobile terminals have been widely applied in numerous aspects of people's life, and have become a leading factor in the development of the semiconductor industry. The majority of the existing portable mobile terminals are provided with chargeable batteries to power system circuits in the mobile terminals. As an increasing number of functions supported by the portal mobile terminals are emerging, their system circuits also consume more and more power, and given a limited capacity of the batteries, the mobile terminals operate for a shorter and shorter period of time after the batteries are charged, resulting in that the batteries have to be charged more and more frequently.

At present the batteries have been widely charged in two general schemes: in one of the schemes, the batteries are charged by a general power source adaptor (charger), i.e., in the standard DCP charging scheme, where the general power source adaptor generally supports an output of only fixed voltage, e.g., 5V, 9V, 12V, etc., so that the output voltage may not be selectable flexibly, and it may take a long period of time to charge the batteries, for example, it typically takes 3 to 4 hours to charge a drained battery of a handset until the battery is fully charged; and in the other scheme, the batteries are charged by a host (e.g., a computer, etc.), i.e., in the SDP charging scheme.

SUMMARY

This section provides a general summary of the disclosure, and is not a comprehensive disclosure of its full scope or all of its features.

In an aspect of this disclosure, there is provided a mobile terminal including a battery, a USB interface, and a microprocessor, where the battery is configured to store electric energy; the USB interface is configured to have an external device inserted there into; and the microprocessor is configured to judge whether two differential data pins of the USB interface are shorted, upon detecting an external device being inserted into the USB interface; if the two differential data pins of the USB interface are not shorted, to conduct USB communication with the inserted external device; if the USB communication fails, to conduct UART communication with the inserted external device; if the UART communication succeeds, to determine the inserted external device as a DC-charging power source adaptor; and to detect voltage of the battery, and if the voltage of the battery is in a range delimited by preset DC-charging thresholds, to control charging voltage output by the DC-charging power source adaptor to DC-charge the battery, and to determine a charging voltage value of the DC-charging power source adaptor according to the current voltage of the battery.

In another aspect of this disclosure, there is provided a DC-charging power source adaptor including a charging interface, an AC to DC converting unit and a controlling unit, wherein the charging interface is configured to be externally connected with a mobile terminal, and including two communication pins disconnected from each other; the AC to DC converting unit is configured to convert an AC input power source into charging voltage required for the mobile terminal, and to output the charging voltage via the charging interface; and the controlling unit, connected with the charging interface, is configured to conduct UART communication with the mobile terminal through the communication pins, after the charging interface is connected with the mobile terminal, to adjust the charging voltage output by the AC to DC converting unit.

This disclosure further provides a method for charging a mobile terminal, the method including: detecting, by the mobile terminal, an external device being inserted into a USB interface thereof, and judging whether two differential data pins of the USB interface are shorted; if the two differential data pins of the USB interface are not shorted, then conducting USB communication with the inserted external device; if the USB communication fails, then conducting UART communication with the inserted external device; if the UART communication succeeds, then determining the inserted external device as a DC-charging power source adaptor; and detecting voltage of a battery of the mobile terminal, and if the voltage of the battery is in a range delimited by preset DC-charging thresholds, then DC-charging the battery using charging voltage output by the DC-charging power source adaptor, and determining a charging voltage value of the DC-charging power source adaptor according to the current voltage of the battery.

This disclosure further provides a method for charging by a DC-charging power source adaptor, the method including: detecting, by the DC-charging power source adaptor, that a charging interface thereof is connected with a mobile terminal; and conducting UART communication with the mobile terminal through two communication pins of the charging interface, disconnected from each other, and determining a charging voltage value output by the DC-charging power source adaptor according to current voltage of a battery of the mobile terminal upon successful communication.

In a further aspect of this disclosure, there is further provided a charging method for charging a battery built in a mobile terminal by a host, a normal power source adaptor, or a DC-charging power source adaptor, the method including: connecting the mobile terminal with an external device; judging, by the mobile terminal, whether two differential data pins of the USB interface are shorted, upon detecting the external device being inserted into a USB interface thereof; if the two differential data pins of the USB interface are not shorted, then conducting USB communication with the inserted external device; if the USB communication fails, then conducting, by the mobile terminal, UART communication with the inserted external device; if the UART communication succeeds, then determining, by the mobile terminal, the inserted external device as the DC-charging power source adaptor; detecting, by the mobile terminal, voltage of the battery thereof, and if the voltage of the battery is in a range delimited by preset DC-charging thresholds, then transmits charging voltage output by the DC-charging power source adaptor directly to the battery to DC-charge the battery; and communicating, by the DC-charging power source adaptor, with the mobile terminal to determine a charging voltage value output by the DC-charging power source adaptor.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

In this disclosure, for the purpose that a mobile terminal in which a chargeable battery is built can identify automatically and accurately the type of a currently inserted external device to thereby invoke different charging management modes for different charging characteristics of different types of external devices so as to make reasonable use of charging resources, this disclosure proposes a charging method for three types of external devices including a host, a normal power source adaptor, and a DC-charging power source adaptor. In this method, firstly a communication mode of the DC-charging power source adaptor is configured so that the DC-charging power source adaptor can exchange data with a mobile terminal to be charged in the UART (Universal Asynchronous Receiver/Transmitter) communication mode; and then a charging managing circuit in the mobile terminal is modified according to the configuration of interface pins of the host and the normal power source adaptor currently charged through a USB data line so that the mobile terminal can identify automatically the three types of external devices including the host, the normal power source adaptor, and the DC-charging power source adaptor.

Firstly hardware configurations of the mobile terminal and the DC-charging power source adaptor will be described below.

Figure 1:
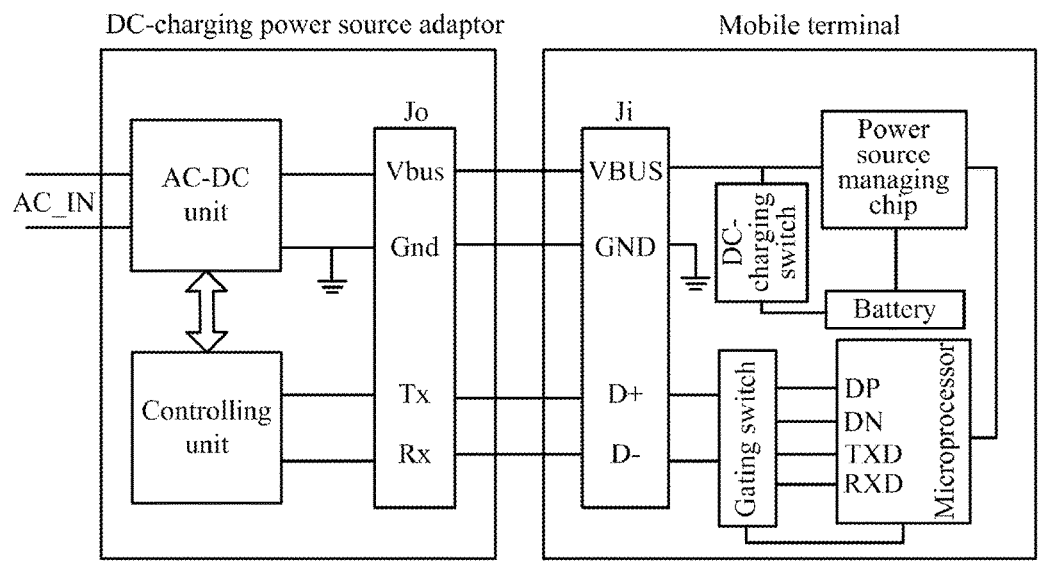
FIG. 1 is a circuit scheme block diagram of an embodiment of a mobile terminal and a DC-charging power source adaptor according to this disclosure.

As illustrated in FIG. 1, in order to maintain the existing traditional charging function of the mobile terminal so that the mobile terminal can be normally plugged in and charged by the existing host and normal power source adaptor, the existing charging interface of the mobile terminal is maintained in this embodiment, i.e., a reused interface for both charging and transmitting data, e.g., the currently widely applied USB interface Ji, so that the mobile terminal can be plugged in and charged by the normal power source adaptor and computer host in the market, which are currently manufactured by the majority of the manufactures. For the power source pin VBUS in the USB interface Ji, in this embodiment, one branch thereof is connected with a power source managing chip in the mobile terminal, and another branch thereof is connected with the battery through a DC-charging switch, where the DC-charging switch can be any type of controllable switch element with low conduction impedance and supporting large current to pass, e.g., controllable silicon, an MOS transistor, etc., to receive a switch control signal output by a microprocessor in the mobile terminal to selectively switch between the normal charging mode and the rapid charging mode. For the ground pin GND in the USB interface Ji, it can be well connected with a systematical ground of the mobile terminal so that the mobile terminal can be grounded together with the external device if the mobile terminal is plugged in the external device. For the differential data pins D+ and D− in the USB interface Ji, they are designed to be connected with the microprocessor through a gating switch, where the gating switch can be a double-pole double-throw switch, to receive a control signal output by the microprocessor, where the differential data pins D+ and D− of the USB interface Ji are connected by default with the differential data interfaces DP and DN of the microprocessor through the gating switch; and if it is detected that the externally connected charging device is neither the host nor the normal power source adaptor, then the gating switch will be controlled by the microprocessor to switch the differential data pins D+ and D− of the USB interface Ji to be connected with the UART interfaces TXD and RXD of the microprocessor to thereby identify in the UART communication mode whether the inserted external device is the DC-charging power source adaptor.

The microprocessor in the mobile terminal can be designed to initiate on its own initiative a communication command to the externally connected charging device in the UART communication mode after the differential data pins D+ and D− of the USB interface Ji are switched to be connected with the UART interfaces TXD and RXD thereof, and if a valid command fed back by the external charging device is received, to determine that the external device plugged in is the DC-charging power source adaptor; and if there is no valid command fed back, to disconnect the UART interfaces TXD and RXD of the microprocessor from the differential data pins D+ and D− of the USB interface Ji without starting the charging mode, or to further output an alert "Inserted Device Can Not Be Identified".

In this embodiment, the DC-charging power source adaptor is configured in the UART communication mode instead of the I²C bus communication mode for the reason that there is small communication traffic, a low rate, and a high anti-interference capability of UART communication in the asynchronous communication mode to thereby avoid effectively communication between the mobile terminal and the power source adaptor from becoming highly instable due to interference from current, impedance, voltage, and other signals so that the mobile terminal can be charged stably and rapidly at large current by the DC-charging power source adaptor to thereby improve the safety of the mobile terminal being charged.

Of course, if the instability above is not taken into account, then communication between the mobile terminal and the DC-charging power source adaptor can be designed in another communication mode than UART (e.g., the I$^2$C bus communication mode, etc.) although this embodiment will not be limited thereto.

Figure 2:
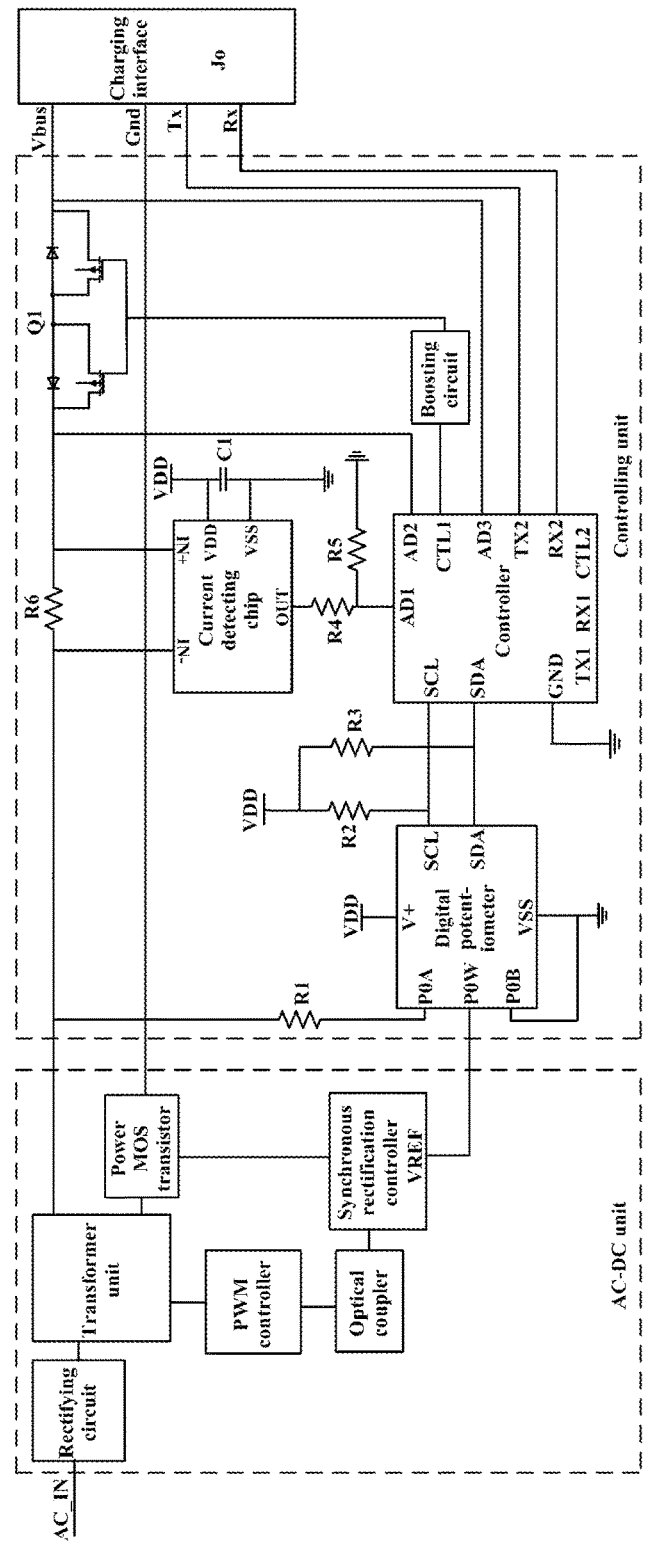
FIG. 2 is a circuit scheme diagram of an embodiment of the DC-charging power source adaptor in FIG. 1.

FIG. 2 illustrates a schematic diagram of circuit components of a DC-charging power source adaptor supporting UART communication, where the DC-charging power source adaptor generally includes three components, i.e., a charging interface Jo, a controlling unit, and an AC-DC unit, as illustrated in FIG. 1 as well, where a power source pin Vbus, a ground pin Gnd, and two communication pins Tx and Rx are arranged in the charging interface Jo. The power source pin Vbus configured to transmit a charging power source is connected with the AC-DC unit to transmit a DC power source output by the AC-DC unit to the power source pin VBUS of the USB interface Ji of the mobile terminal to charge the mobile terminal. The ground pin Gnd is connected with the system ground of the DC-charging power source adaptor, and after the DC-charging power source adaptor is plugged in the mobile terminal, the ground pin Gnd is connected with the ground pin GND of the USB interface Ji of the mobile terminal so that both of the ground pins are grounded together. The two communication pins Tx and Rx of the charging interface Jo are connected with a UART interface of the controlling unit, and if the DC-charging power source adaptor is plugged in the mobile terminal, then the communication pins Tx and Rx are connected respectively with the differential data pins D+ and D− of the USB interface Ji of the mobile terminal for UART communication between the DC-charging power source adaptor and the mobile terminal so that the volt value of the charging voltage output by the AC-DC unit is adjusted according to received control information to thereby charge the mobile terminal differently as required in different phases.

In order to adjust dynamically the charging voltage output by the AC-DC unit, in this embodiment, a rectifying circuit, a transformer unit, a synchronous rectification controller, a PWM controller, an optical coupler, a power MOS transistor, and other elements are designed in the AC-DC unit; and a controller, a digital potentiometer, a current detecting chip, a boosting circuit, and other elements are designed in the controlling unit, as illustrated in FIG. 2, where the rectifying circuit receives an AC input power source AC_IN provided by a mains grid, rectifies the AC input power source into a DC power source, and outputs the DC power source to the transformer unit to be transformed into the charging voltage to charge the mobile terminal. The controller has its UART interfaces TX2 and RX2 connected with the communication pins Tx and Rx of the charging interface Jo for UART communication with the microprocessor in the mobile terminal to exchange handshake instructions therewith, to receive the control information sent by the mobile terminal after the handshake succeeds, and to adjust dynamically the volt value of the charging voltage output by the AC-DC unit as the voltage of the battery in the mobile terminal varies.

In order to adjust the output voltage of the AC-DC unit, in this embodiment, the digital potentiometer is designed in the controlling unit to be connected with the controller. The controller generates a voltage adjusting instruction according to the received control information, and sends the voltage adjusting instruction to the digital potentiometer to change the resistance value of a valid resistor of the digital potentiometer. In this embodiment, the controller can be connected and communicates with the digital potentiometer over an I$^2$C bus, as illustrated in FIG. 2 to transmit the voltage adjusting instruction. In order to ensure the stability of transmission of the signal, in this embodiment, a voltage pull-up circuit is further connected over the I$^2$C bus, for example, a clock line SCL and a data line SDA of the I$^2$C bus are connected with a DC power source VDD respectively through pull-up resistors R2 and R3 to thereby improve the anti-interference capability of the transmission of the signal.

The DC power source VDD can be embodied as a set of small electromagnetic coils designed separately in the transformer unit. The ratio of the number of turns of a primary coil and the number of turns of a secondary coil in the set of small electromagnetic coils is configured to transform the DC power source output by the rectifying circuit into the desirable DC power source VDD to power those components in the DC-charging power source adaptor to provide the components with desirable DC operating voltage, e.g., the controller, the digital potentiometer, the current detecting chip, and other components to thereby enable them to operate.

The digital potentiometer is a resistance-adjustable resistor element in which a resistor body is built. In this embodiment, the resistor body connected in series with a current-limiting resistor R1 is connected between the anode of a secondary coil in another set of electromagnetic coils (referred below simply to as the other set of electromagnetic coils) in the transformer unit and the ground. One end P0A of the resistor body is connected with the anode of the secondary coil in the other set of electromagnetic coils through the current-limiting resistor R1 connected in series, and the other end P0B of the resistor body is grounded. An intermediate tap P0W of the resistor body is connected with a reference voltage pin VREF of the synchronous rectification controller, and if the resistance value of the valid resistor of the digital potentiometer varies, then the volt value of the charging voltage output by the other set of electromagnetic coils in the transformer unit will be adjusted in order to maintain the reference voltage on the reference voltage pin VREF of the synchronous rectification controller. In order to adjust the volt value of the charging voltage, the synchronous rectification controller adjusts its output control signal according to the varying resistance value of the valid resistor of the digital potentiometer, and transmits the control signal to the PWM controller after the control signal is optic-electrically isolated by the optical coupler, to thereby adjust a duty ratio of a PWM signal output by the PWM controller. The PWM signal is transmitted to the transformer unit, and can be transmitted to a switch transistor connected in series with a primary coil in the other set of electromagnetic coils, to control the switch transistor to be switched on or off to thereby adjust the switching timing of the other set of electromagnetic coils so as to further adjust the volt value of the charging voltage output by the secondary coil thereof for the purpose of adjusting dynamically the charging voltage.

In this embodiment, the charging voltage output by the transformer unit can be finely adjusted in the range of 3.6V to 12V to thereby charge different mobile terminals as required in reality.

In order to achieve the stability of the charging voltage output by the transformer unit, in this embodiment, instead of using a traditional rectification scheme in which a diode is connected in series on a charging voltage transmission line, the power MOS transistor is connected on the charging voltage transmission line and is switched on or off based on the switching signal output by the synchronous rectification controller to thereby shape the waveform of the charging voltage output by the transformer unit.

In this embodiment, the power MOS transistor can be an NMOS transistor connected between the cathode of the secondary coil in the other set of electromagnetic coils and the ground pin Gnd of the charging interface Jo. Since the DC-charging power source adaptor supports an output of large current, if the charging voltage output by the transformer unit is shaped by the diode, then power consumption of the DC-charging power source adaptor may be increased and the efficiency in charging may be lowered due to a significant voltage drop across the conducting diode. In this embodiment, the charging voltage is shaped by the power MOS transistor, and since the power MOS transistor has low inner resistance and supports large current passing, systematic power consumption of the DC-charging power source adaptor can be lowered effectively and the efficiency in charging the mobile terminal can be improved.

In order to detect in real time charging current output by the transformer unit to thereby improve the safety in charging, in this embodiment, a current detecting unit is further arranged in the DC-charging power source adaptor to detect in real time charging current $I_{chg}$ output via the charging interface Jo, and to feed back the charging current to the controller, and the current detecting unit further includes a sampling resistor R6 and a current detecting chip, as illustrated in FIG. 2. The sampling resistor R6 is connected in series in a transmission line of the charging current, and can be between the anode of the secondary coil in the other set of electromagnetic coils in the transformer unit and the power source pin Vbus of the charging interface Jo. Inputs −IN and +IN of the current detecting chip are connected with two ends of the sampling resistor R6 to acquire a voltage drop across the sampling resistor R6, and after the voltage drop is amplified, the magnitude of the charging current is calculated from the voltage drop and the resistance value of the sampling resistor R6. The current detecting chip generates sample voltage corresponding to the calculated magnitude of the charging current, and transmits the sample voltage to an ADC interface AD1 of the controller through an output OUT thereof, and the sample voltage is analog-to-digital converted by the controller into a charging current value, so the controller can detect in real time the charging current.

If the range of the amplitude of the sample voltage output by the current detecting chip exceeds an interface voltage range specified for the ADC interface AD1 of the controller, then the ADC interface of the controller may be damaged. In order to protect the controller, an voltage dividing circuit can be additionally arranged between the output OUT of the current detecting chip and the ADC interface AD1 of the controller, e.g., a resistor voltage dividing circuit composed of resistors R4 and R5, to adjust the voltage signal output by the current detecting chip within the interface voltage range acceptable to the AD1 interface of the controller so as to avoid the ADC interface AD1 of the controller from being damaged due to the input voltage being too high.

In order to improve the safety in charging so that the DC-charging power source adaptor can have the charging power source disconnected rapidly upon abnormal charging occurring to thereby avoid the mobile terminal from being damaged, in this embodiment, a switch transistor Q1 supporting large current passing is further arranged in the charging power source transmission line of the DC-charging power source adaptor so that a switch voltage, generated by the boosting circuit, sufficient to drive the switch transistor Q1 to be switched on is transmitted to a control pole of the switch transistor Q1 to control the switch transistor Q1 to be switched on or off to thereby have the charging power source transmission line connected or disconnected.

In this embodiment, the switch transistor can be a pair of NMOS transistors Q1 in which parasitic diodes connected in anti-parallel are built, as illustrated in FIG. 2. The switch path of the pair of NMOS transistors Q1 are connected in series in the transmission line of the charging power source, and the sources of the two NMOS transistors in the pair of NMOS transistors Q1 can be connected with each other, the drains of the two NMOS transistors can be connected respectively with the anode of the secondary coil in the other set of electromagnetic coils in the transformer unit, and the power source pin Vbus of the charging interface Jo; and then the gates of the two NMOS transistors can be connected with the boosting circuit. An enable end of the boosting circuit is connected with the controller to receive an enable signal output by the controller. During charging, if the controller detects normal charging current, then the controller may output the valid enable signal to control the boosting circuit to be enabled into operation to boost the DC power source output by the transformer unit to the switch voltage higher than the volt value of the charging voltage, and the switch voltage is output to the gates of the pair of NMOS transistors Q1 to control the pair of NMOS transistors Q1 to be switched on to have the transmission line of the charging power source connected, so that the charging power source can be output to the externally connected mobile terminal to charge the battery in the mobile terminal. If the controller detects abnormal charging current or receives control information sent by the mobile terminal to stop charging, then the controller may output the invalid enable signal to control the boosting circuit to stop operating. At this time, the pair of NMOS transistors Q1 is switched off due to the disappearing voltage at the gates thereof, to thereby have the transmission line of the charging power source disconnected to block the charging power source from outputting to the outside, so that the DC-charging power source adaptor can be controlled to stop powering the mobile terminal.

A charging method performed by the mobile terminal and the DC-charging power source adaptor will be described below in details in connection with the hardware configurations illustrated in FIG. 1 and FIG. 2.

Figure 4:
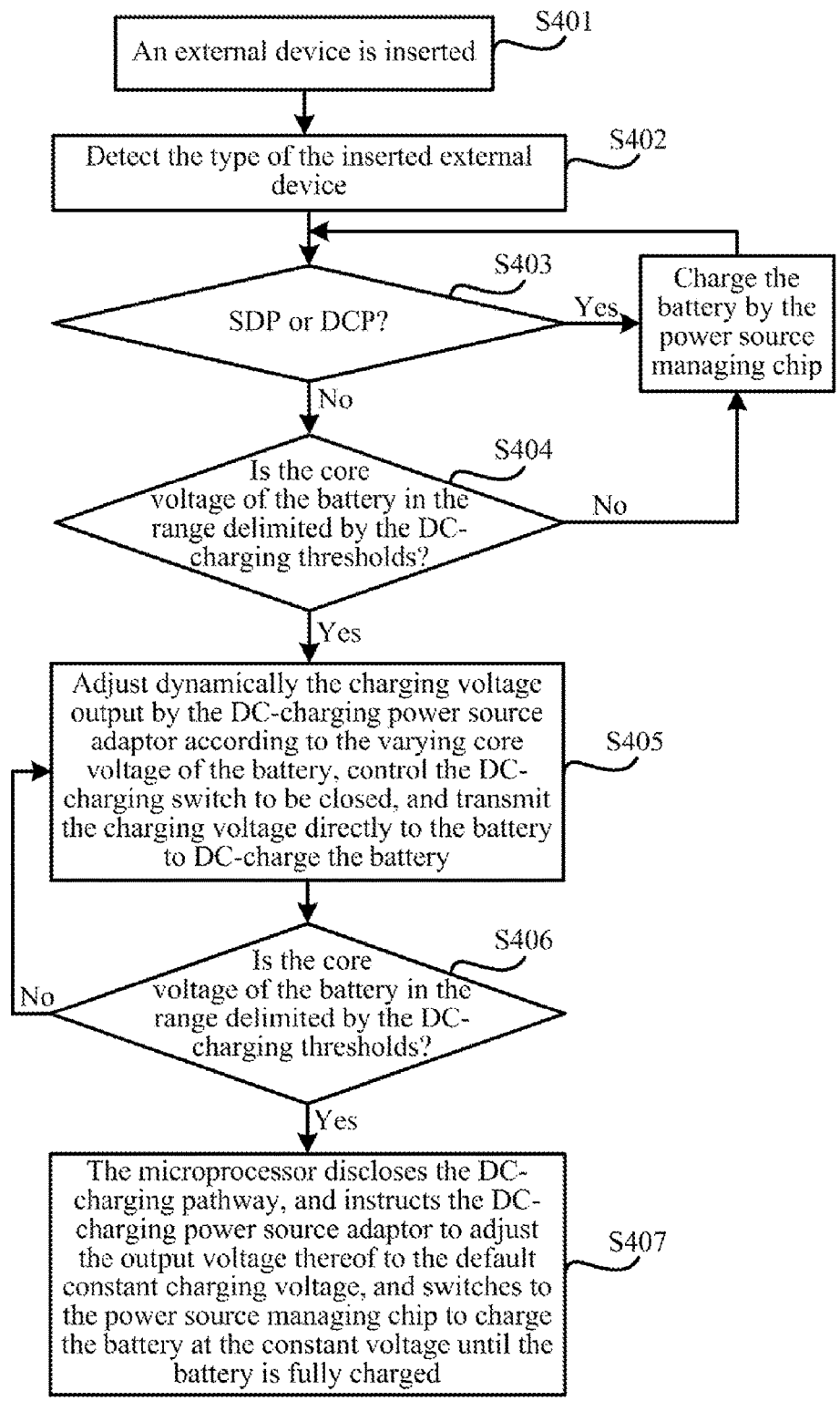
FIG. 4 is a flow chart of a process of an embodiment of a charging method according to this disclosure.

As illustrated in FIG. 4, a charging control flow generally involves the following operations:

S401. The mobile terminal detects whether an external device is inserted, and performs subsequent operations upon detecting an inserted external device.

In this embodiment, detection of whether an external device is inserted can be performed as in the prior art, for example, by detecting whether a DC power source is connected to the power source pin VBUS of the USB interface Ji of the mobile terminal. In the traditional host charging mode SDP and normal power source adaptor charging mode DCP, the charging voltage output by the host and the normal power source adaptor is typically 5V; and the DC-charging power source adaptor can be configured to output by default the same constant charging voltage as the host and the normal power source adaptor, e.g., 5V constant charging voltage so that the mobile terminal can determine whether the DC-charging power source adaptor is inserted.

Of course the 5V constant charging voltage here only relates to an embodiment, and for some mobile terminal to be charged at constant voltage of another volt value, the DC-charging power source adaptor will be simply configured to output by default the same constant charging voltage as the charging voltage output by the normal power source adaptor when the normal power source adaptor powers the mobile terminal.

S402. The mobile terminal detects the type of the inserted external device.

In this embodiment, the mobile terminal operates by default without being DC-charged, that is, the microprocessor in the mobile terminal controls by default the DC-charging switch to be opened to have the power source pin VBUS of the USB interface Ji connected with the power source managing chip. Also the microprocessor controls the gating switch to be kept in the default state to have the differential data pins D+ and D− of the USB interface Ji connected with the differential data interfaces DP and DN of the microprocessor.

Figure 3:
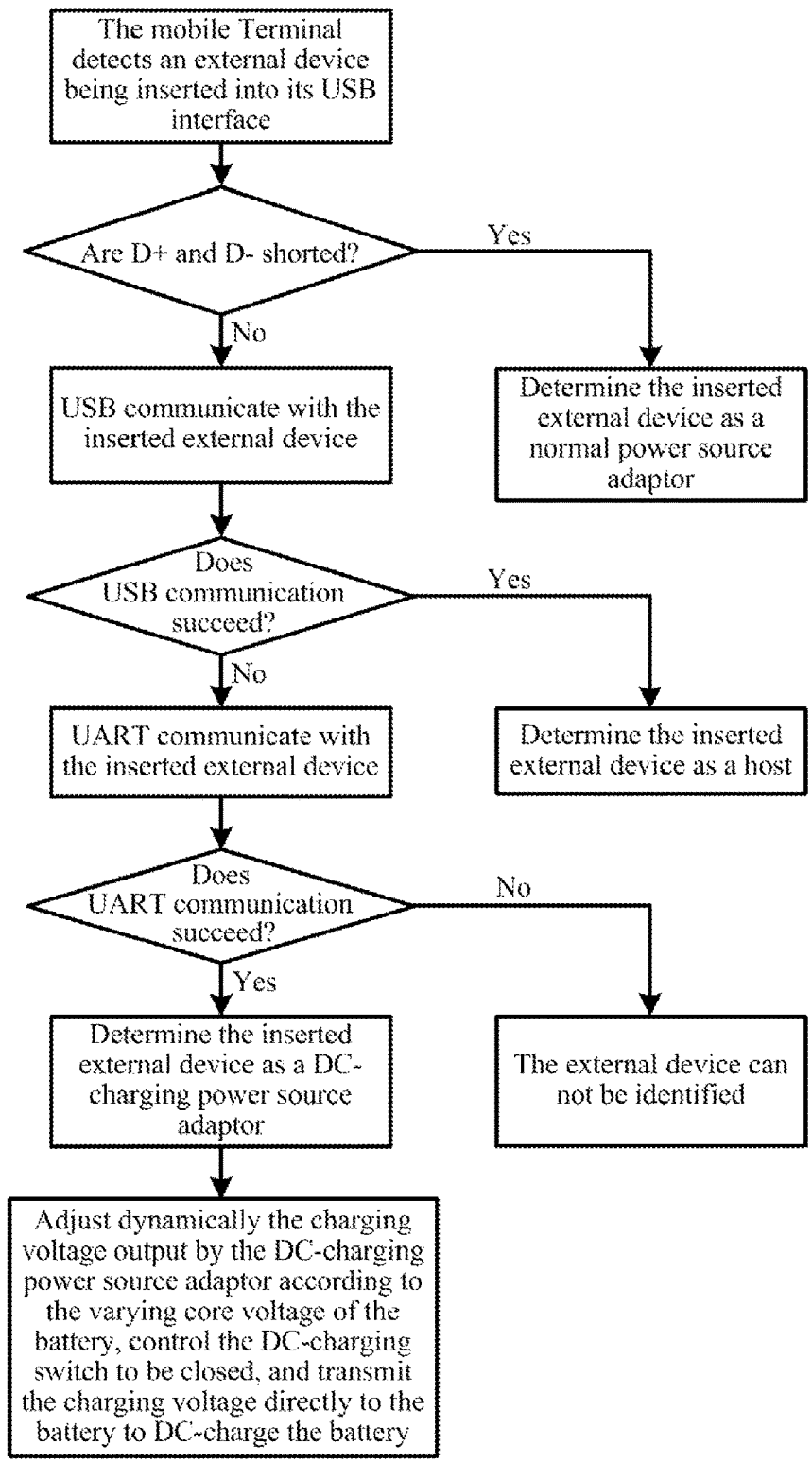
FIG. 3 is a flow chart of a process of an embodiment of a charging method according to this disclosure.

Whether the inserted external device is the host or the normal power source adaptor can be determined as in the existing BC1.2 charging type detection scheme. Of course this can alternatively be determined as follows as illustrated in FIG. 3:

If the mobile terminal detects that an external device is inserted into the charging interface thereof, then the mobile terminal firstly determines whether the differential data pins D+ and D− thereof are shorted, and if so, then the mobile terminal determines that the inserted external device is the normal power source adaptor because the communication pins of the existing normal power source adaptor are substantially configured to be shorted; if the differential data pins D+ and D− are not shorted, the mobile terminal conducts USB communication with the external device through the microprocessor, and if the communication succeeds, then the mobile terminal determines that the inserted external device is the host because the existing host (e.g., the computer host) typically is connected and communicates with and powers the mobile terminal through the USB data line; if the communication fails, the inserted external device may be the DC-charging power source adaptor. In order to determine whether the inserted external device is the DC-charging power source adaptor, the microprocessor firstly controls the gating switch to operate to switch the differential data pins D+ and D− of the USB interface Ji to be connected with the UART interfaces TXD and RXD of the microprocessor. Then the microprocessor communicates with the external device in the UART communication mode, and if the communication succeeds, then the mobile terminal determines that the inserted external device is the DC-charging power source adaptor; otherwise, the mobile terminal does not start the charging mode, or can further output an alert "Inserted Device Can Not Be Identified".

Figure 5:
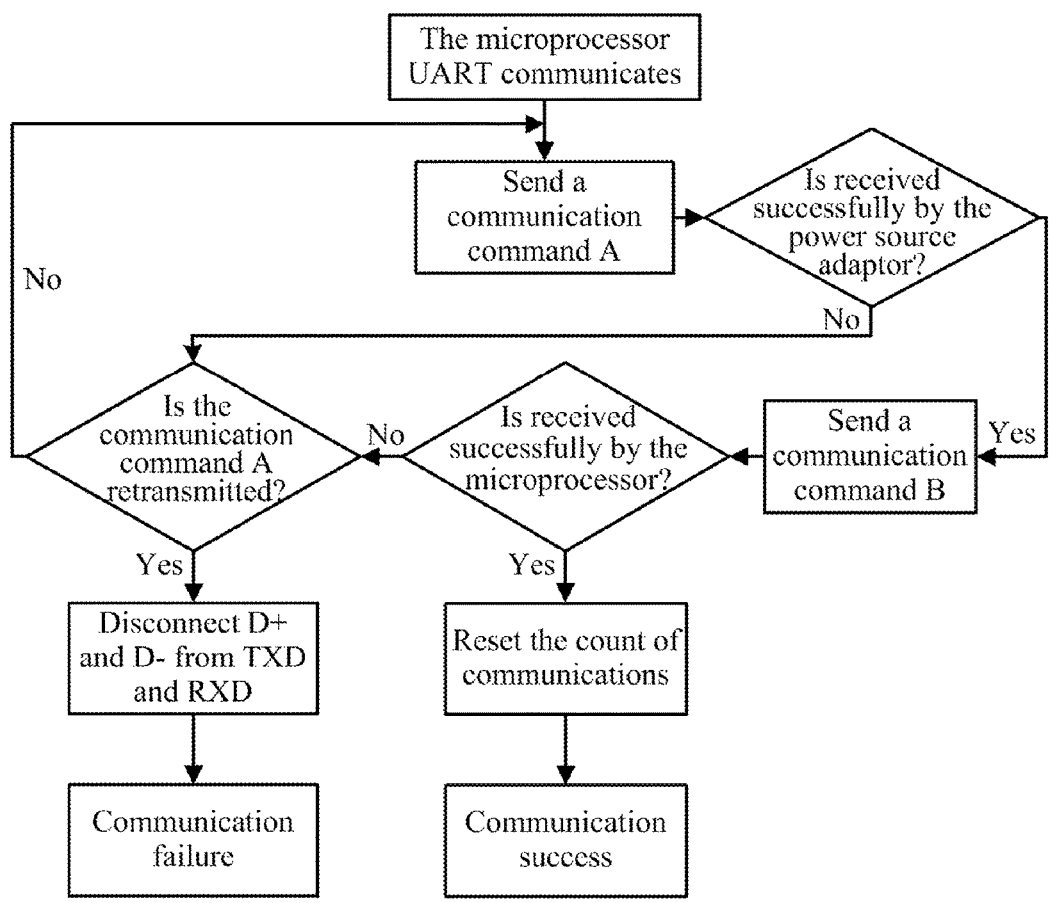
FIG. 5 is a flow chart of an embodiment of detecting communication between the mobile terminal and the DC-charging power source adaptor illustrated in FIG. 1.
Figure 6:
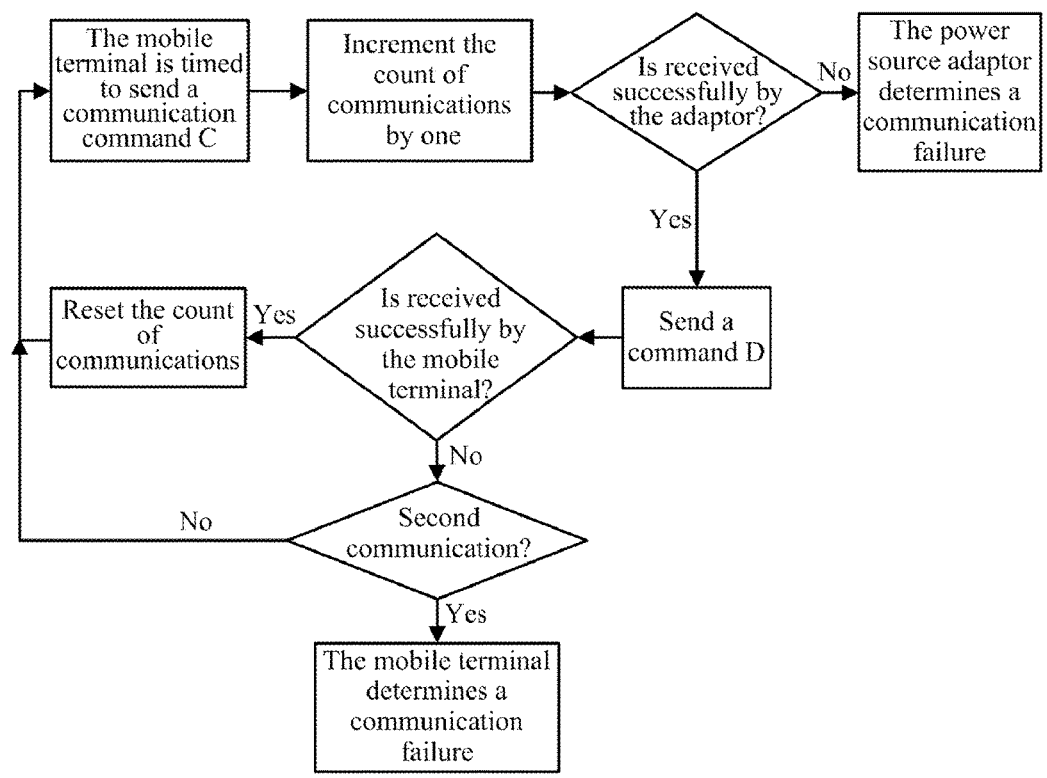
FIG. 6 is a flow chart of an embodiment of a timed detection mechanism of communication between the mobile terminal and the DC-charging power source adaptor illustrated in FIG. 1.

In order to enable a better switching mechanism and error-tolerant mechanism, in this embodiment, communication between the mobile terminal and the DC-charging power source adaptor can be detected in the following flow as illustrated in FIG. 5: the microprocessor initiates on its own initiative a communication command A to the external power source adaptor after switching the communication interface thereof from the differential data interfaces DP and DN to the UART interfaces TXD and RXD, and also counts the number of communications. The DC-charging power source adaptor receiving successfully the communication command A can respond accordingly, and send a communication command B to the mobile terminal, and if the mobile terminal does not receive any valid communication command B, then the microprocessor firstly determine the count of communications at that time, and if the count of communications is less than 2, then the microprocessor retransmits the communication command A for a second attempt on communication; and if the count of communications is more than or equal to 2, then the microprocessor determines that the communication fails, and disconnects the differential data pins D+ and D− of the USB interface Ji of the mobile terminal from the UART interfaces TXD and RXD of the microprocessor to return the original state where the differential data pins D+ and D− of the USB interface Ji are connected with the differential data pins DP and DN of the microprocessor. If the mobile terminal receives successfully the communication command B, then the microprocessor determines that the communication succeeds, and resets the count of communications, and thereafter can start a timed communication detecting mechanism as illustrated in FIG. 6.

In the timed communication detecting mechanism, the mobile terminal is timed to send a handshake instruction, e.g., a communication instruction C, to the DC-charging power source adaptor, and also increments the count of communications by one; and if the DC-charging power source adaptor receives successfully the communication instruction C, then it feeds back immediately a response instruction to the mobile terminal, for example, it sends a communication instruction D to the mobile terminal. If the mobile terminal receives successfully the communication instruction D, then the handshake succeeds, and the mobile terminal determines that the communication between them is normal, maintains the current charging process, resets the count of communications, and waits for arrival of a next timed detection period and then initiates again the communication instruction C. If the mobile terminal does not receive the communication instruction D, then the mobile terminal retransmits the communication instruction C to the DC-charging power source adaptor, and if both of the communications fail, then the mobile terminal determines that the DC-charging power source adaptor plugged in becomes abnormal. In order to ensure the safety of the mobile terminal, at this time the microprocessor has the connection line between the USB interface Ji of the mobile terminal and the internal system circuits thereof disconnected, and notifies the user of the abnormality of the externally connected power source adaptor to thereby alert the user.

S403. The mobile terminal enters a corresponding charging mode according to the detected type of the external device.

In this embodiment, if the inserted external device is detected as the host or the normal power source adaptor, then the battery is charged by the power source managing chip in the standard SDP charging mode (if the host is inserted) or the standard DCP charging mode (if the normal power source adaptor is inserted).

The microprocessor controls the DC-charging switch to be kept in the default Off state, and also starts the power source managing chip to receive the charging voltage input by the host or the normal power source adaptor, and to enter different charging phases according to current core voltage of the battery. By way of an example, for a 4.2V chargeable battery (4.2V is core voltage of the battery being fully charged), if the core voltage is less than 3.5V, then the power source managing chip enters a small-current pre-charging phase in which 500 mA charging current is output, and the battery is pre-charged at the small current. If the core voltage of the battery lies between 3.5V and 4.1V, then the power source managing chip enters a constant-current charging phase in which 1 A or 1.5 A charging current is output, and the battery is charged at the constant current. The battery is charged in the constant-current charging phase in the majority of the entire charging process, and typically it takes approximately 90% of the entire charging period of time for the core voltage of the battery to rise from 3.5V to 4.1V. If the core voltage of the battery rises above 4.1V, then the power source managing chip enters a constant-voltage charging phase in which constant voltage is output to charge the battery, and at this time the charging current is gradually decreased with the rising voltage of the battery until the battery is fully charged.

If the inserted external device is detected as the DC-charging power source adaptor, then the mobile terminal operates in a subsequent rapid charging mode.

S404. The mobile terminal judges whether the core voltage of the battery lies in a range delimited by DC-charging thresholds, and if so, then the mobile terminal performs a subsequent large-current DC-charging process; otherwise, the battery is charged by the power source managing chip.

In this embodiment, the DC-charging thresholds (a lower voltage threshold S1 and an higher voltage threshold S2) can be determined dependent upon the real condition of the battery, and the range delimited by the DC-charging thresholds can be the same as the voltage range of the battery corresponding to the constant-current charging phase in the standard DCP charging mode. For example, the lower voltage threshold S1 and the higher voltage threshold S2 of the 4.2V chargeable battery can be set to S1=3.5V and S2=4.1V respectively. If the core voltage $V_{bat\_real}$ of the battery is $V_{bat\_real}<3.5V$ or $V_{bat\_real}>4.1V$, then the microprocessor controls the DC-charging switch to be kept in the default Off state, and also starts the power source managing chip to receive the constant charging voltage input by the DC-charging power source adaptor, e.g., DC 5V charging voltage, to pre-charge the battery at small current (for $V_{bat\_real}<3.5V$) or at constant voltage (for $V_{bat\_real}>4.1V$), that is, the battery is charged in the same charging mode as the host and the normal power source adaptor. If the core voltage $V_{bat\_real}$ of the battery is detected in the range [3.5V, 4.1V] delimited by the DC-charging thresholds, then the mobile terminal enters the subsequent DC-charging process.

S405. The mobile terminal communicates with the DC-charging power source adaptor via the UART interface thereof, adjusts dynamically the charging voltage output by the DC-charging power source adaptor according to the varying core voltage of the battery, controls the DC-charging switch to be closed to have the power source managing chip shorted so that the power source managing chip stops operating, and the charging voltage is transmitted directly to the battery to DC-charge the battery.

In this embodiment, the charging voltage can be adjusted dynamically in any one of the following three designed approaches:

In a first designed approach, a relationship reference table between the core voltage of the battery and the target charging voltage is preset in the mobile terminal, the core voltage of the battery is detected, and the reference table is searched using the core voltage for the target charging voltage corresponding to the core voltage to control the voltage output of the DC-charging power source adaptor.

The core voltage of the battery can be divided into several intervals according to the range [S1, S2] delimited by the DC-charging thresholds, for example, the core voltage is divided into N intervals at a span of 100 mV, where N=(S2−S1)/100 mV. For each interval, a target charging voltage value $V_{out}$, a target charging current value $I_{targ}$, and a charging current maximum value $I_{max}$ corresponding to the core voltage in the interval are predetermined, and the reference table is created and stored in the microprocessor, or in a memory in the mobile terminal, connected with the microprocessor for invoking by the microprocessor.

Figure 7:
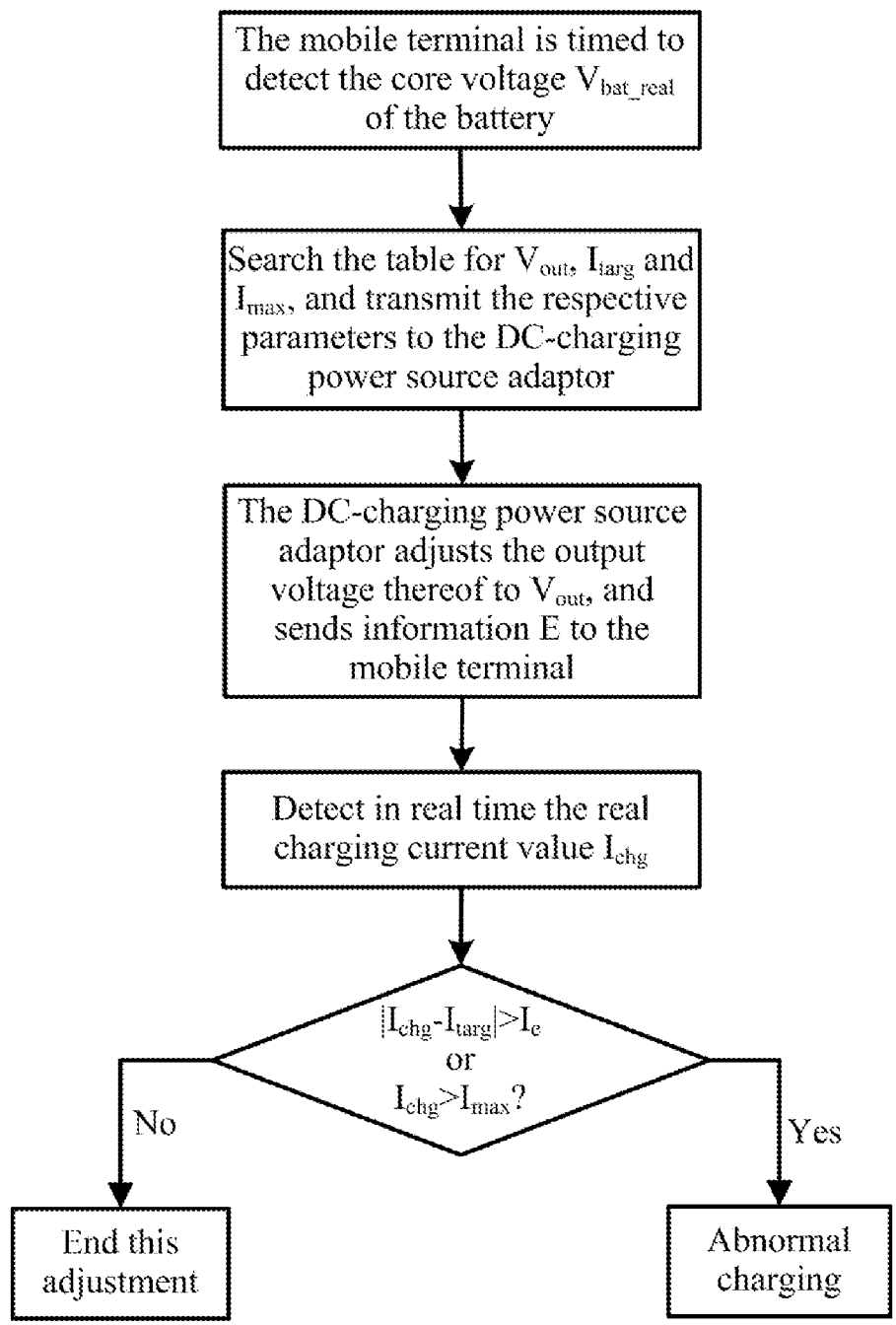
FIG. 7 is a flow chart of control in an embodiment of a DC-charging control strategy using a lookup table.

After entering the DC-charging process, as illustrated in FIG. 7, the microprocessor is timed to detect the core voltage $V_{bat\_real}$ of the battery, searches the reference table using the detected core voltage $V_{bat\_real}$, determines the core voltage interval in which the core voltage $V_{bat\_real}$ lies, and then searches using the determined interval for the target charging voltage value $V_{out}$, the target charging current value $I_{targ}$, and the charging current maximum value $I_{max}$ corresponding to the interval. Thereafter the microprocessor conducts UART communication with the DC-charging power source adaptor, and sends the target charging voltage value $V_{out}$, the target charging current value $I_{targ}$, and the charging current maximum value $I_{max}$ to the DC-charging power source adaptor.

At the DC-charging power source adaptor side, the DC-charging power source adaptor adjusts the resistance value of the valid resistor of the digital potentiometer thereof according to the received target charging voltage value $V_{out}$ to thereby change the charging voltage output by the AC-DC unit thereof to the target charging voltage value $V_{out}$. At the end of the adjusting, the DC-charging power source adaptor sends information E to the mobile terminal, detects in real time the real charging current $I_{chg}$ output by the AC-DC unit, through the current detecting chip, and if $|I_{chg}-I_{targ}|>I_e$ ($I_e$ represents a controllable range of the difference between the real charging current value of the DC-charging power source adaptor and the target charging current value, and can be set to $I_e$=500 mA in this embodiment), or $I_{chg}>I_{max}$, then the DC-charging power source adaptor determines abnormal charging. At this time in order to ensure the safety in charging, the DC-charging power source adaptor outputs the invalid enable signal through the controller therein, as illustrated in FIG. 2, to control the boosting circuit to stop outputting the switch voltage, and to further control the pair of MNOS transistors Q1 to be switched off to thereby block the charging power source output by the AC-DC unit from being transmitted to the mobile terminal. If $|I_{chg}-I_{targ}|\le I_e$ and $I_{chg}\le I_{max}$, then the DC-charging power source adaptor ends this adjusting process, and DC-charges at large current the battery in the mobile terminal using the adjusted charging voltage, where the charging current here can rise beyond 3500 mA, to thereby significantly speed up the charging.

The following implementation to create the reference table is proposed in this embodiment:

A number i of intervals, denoted as $x_{i1} \sim x_{i2}$, are set for the core voltage in the range of [S1, S2];

For each of the intervals [$x_{i1}$, $x_{i2}$], a target charging voltage value $V_{out}$, a target charging current value $I_{targ}$, and a charging current maximum value $I_{max}$ corresponding to the interval are calculated respectively in the equations of:

$$V_{out}=V_{bat\_real}+I_{targ}*(R_{line}+R_{board}+R_{bat}) \quad (1)$$

$$I_{targ}=I_{max}-\Delta I \quad (2)$$

$$I_{max}=\min((V_{bat\_max}-V_{bat\_real})/R_{bat},I_{allow}) \quad (3)$$

Where $R_{line}$ represents a resistance value on the charging line; $R_{board}$ represents a resistance value on a circuit board of the mobile terminal; $R_{bat}$ represents an inner resistance value of the battery, which can be experimentally measured; $V_{bat\_max}$ represents the maximum terminal voltage value supported by the battery, which shall be determined by a hardware platform on which the mobile terminal operates, and which shall be less than a specified safe value $V_{bat\_safe}$ of the terminal voltage of the battery; $I_{allow}$ represents the maximum safe charging current value selected while ensuring the safety of the battery being charged; and $\Delta I$ represents a preset difference in current, which lies in the range of [150 mA, 250 mA]; and The reference table is created according to the parameters $V_{bat\_real}$, $V_{out}$, $I_{targ}$ and $I_{max}$.

In this embodiment, in order not to measure $R_{line}$ and $R_{board}$, the sum of the resistance value $R_{line}$ on the charging line, and the resistance value $R_{board}$ on the circuit board of the mobile terminal can be calculated in the equation of:

$$R_{line}+R_{board}=(V_{out}-V_{bat})/I_{chg} \quad (4)$$

Where $V_{bat}$ represents the terminal voltage of the battery. That is, the terminal voltages $V_{bat}$ of the battery, and the charging currents $I_{chg}$, for different target charging voltage values $V_{out}$ can be measured in reality, and substituted into Equation (4) to calculate the sum of $R_{line}$ and $R_{board}$, which is substituted into Equation (1) to calculate the target charging voltage value $V_{out}$.

In an implementation of this embodiment, the target charging voltage value $V_{out}$ and the charging current maximum value $I_{max}$ corresponding to each interval $[x_{i1}, x_{i2}]$ are calculated as follows: a lower bound value $x_{i1}$ of the core voltage in the interval is used as $V_{bat\_real}$ and substituted into Equation (1) to calculate the target charging voltage value $V_{out}$ corresponding to the interval; a higher bound value $x_{i2}$ of the core voltage in the interval is used as $V_{bat\_real}$ and substituted into Equation (3) to calculate the charging current maximum value $I_{max}$ corresponding to the interval; and further the target charging current value $I_{targ}$ is derived from calculated $I_{max}$ in Equation (2), and the reference table is created.

By way of an example, still taking the 4.2V chargeable battery as an example, for the system powered by the battery, from the perspective of the safety of providing voltage to the device, the terminal voltage $V_{bat}$ of the battery shall not be more than a fixed value $V_{bat\_max}$, where the fixed value $V_{bat\_max}$ is dependent upon the platform and less than the specified safe value $V_{bat\_safe}$ of the terminal voltage of the battery. If the safe value $V_{bat\_safe}$ of the terminal voltage of the battery is $V_{bat\_safe}$=4500 mV, then $V_{bat\_max}$=4470 mV can be taken, so the terminal voltage $V_{bat}$ of the battery is $V_{bat}=V_{bat\_real}+I_{chg}*R_{bat}\leq 4470$.

From the perspective of the safety of the battery, if the maximum safe charging current value is taken as $I_{allow}$=4000 mA, then the charging current maximum value $I_{max}$ is calculated as follows in Equation (3):

$$I_{max}=\min((4470-V_{bat\_real})/R_{bat},4000) \quad (5)$$

If the inner resistance $R_{bat}$ of the battery is $R_{bat}$=100 mΩ, the other impedance is $R_{line}+R_{board}$=100 mΩ, and the range delimited by the DC-charging thresholds of the battery is [3500 mV, 4100 mV] at a span of 100 mV, then the range [3500 mV, 4100 mV] delimited by the DC-charging thresholds is divided into 6 intervals; a higher bound value of the core voltage in each interval is substituted into Equation (5) to calculate the charging current maximum value $I_{max}$; the target charging current value $I_{targ}$ is derived from calculated $I_{max}$ in Equation (2), and $\Delta I$=200 mA is taken in this embodiment; and a lower bound value of the core voltage in each interval is substituted into Equation (1) to calculate the target charging voltage value $V_{out}$ from calculated $I_{targ}$, so the desirable reference table is created as follows:

| $V_{bat\_real}$(mV) | $V_{out}$(mV) | $I_{targ}$(mA) | $I_{max}$(mA) |
|---|---|---|---|
| 3500-3600 | 4260 | 3800 | 4000 |
| ... | ... | ... | ... |
| 4000-4100 | 4700 | 3500 | 3700 |

The reference table reflects to some extent the correspondence relationship between the core voltage of the battery, and the charging current and the charging voltage output by the adaptor, but there may be a minor error relative to the real correspondence relationship, so the battery can be experimentally charged to record the charging voltage varying with the varying charging current, and to adjust the values of the parameters in the reference table, for example, the values of the respective parameters in the reference table are adjusted to their ideal values by averaging them.

The target charging voltage obtained by looking up from the table is a theoretical value, however in reality, the inner resistance of the battery, and the impedance on the line may vary with temperature, aging, and other factors, so the real charging current value $I_{chg}$ output by the DC-charging power source adaptor deviates to some extent from the target charging current value $I_{targ}$, thus resulting in some influence upon the charging speed. In order to boost the charging current as much as possible in an allowable range to further speed up charging, in this embodiment, a charging current self-adjusting algorithm is introduced at the DC-charging power source adaptor end, that is, after the DC-charging power source adaptor adjusts the output voltage to $V_{out}$, if $I_{targ}-I_e \leq I_{chg} < I_{targ}$, then $V_{out}=V_{out}+\Delta V$ is adjusted progressively so that the real charging current value $I_{chg}$ output by the DC-charging power source adaptor approaches progressively the target charging current value $I_{targ}$.

In this embodiment, $V_{out}$ is adjusted for five times by an amount which can be estimated in Equation (1), and if $V_{bat\_real}$ and R (including the inner resistance of the battery, the line resistance, and all the other impedances) are invariable, then $\Delta V=\Delta I*R$. In this embodiment, $\Delta V$ is set to $\Delta V$=10 mV.

In a second designed approach, a relationship reference table between the core voltage of the battery and the target charging voltage is preset at the DC-charging power source adaptor end, and the DC-charging power source adaptor searches the reference table using the received core voltage (detected and provided by the mobile terminal) for the target charging voltage value corresponding to the core voltage. Thereafter the DC-charging power source adaptor adjusts the output voltage thereof to the target charging voltage value to DC-charge the battery built in the mobile terminal at large current.

Reference can be made for the related description in the first designed approach above for creation of the reference table.

After entering the DC-charging process, as illustrated in FIG. 7, at the mobile terminal side, the microprocessor is timed to detect the core voltage $V_{bat\_real}$ of the battery, conducts UART communication with the DC-charging power source adaptor, and is timed to send the detected core voltage $V_{bat\_real}$ to the DC-charging power source adaptor.

At the DC-charging power source adaptor side, the DC-charging power source adaptor searches the stored reference table thereof using the received core voltage $V_{bat\_real}$, determines the core voltage interval in which the core voltage $V_{bat\_real}$ lies, and then searches using the determined interval for the target charging voltage value $V_{out}$, the target charging current value $I_{targ}$, and the charging current maximum value $I_{max}$ corresponding to the interval. Then the controller adjusts the resistance value of the valid resistor of the digital potentiometer to thereby change the charging voltage output by the AC-DC unit thereof to the target charging voltage value $V_{out}$. At the end of the adjusting, the DC-charging power source adaptor sends information E to the mobile terminal, and sends $I_{targ}$ and $I_{max}$ to the mobile terminal for detection of abnormal charging. At the same time the DC-charging power source adaptor detects in real time the real charging current $I_{chg}$ output by the AC-DC unit, through the current detecting chip thereof, and if $|I_{chg}-I_{targ}|>I_e$ or $I_{chg}>I_{max}$, then the DC-charging power source adaptor determines abnormal charging, disconnects the charging power source from being output, and stops charging the mobile terminal. If $|I_{chg}-I_{targ}|\le I_e$ and $I_{chg}\le I_{max}$, then the DC-charging power source adaptor ends this adjusting process.

Also the charging current self-adjusting algorithm described in the first designed approach above can be introduced at the DC-charging power source adaptor end, so that the real charging current value $I_{chg}$ output by the DC-charging power source adaptor can approach progressively the target charging current value $I_{targ}$ to thereby further speed up charging.

The table-lookup approach above relating to segmented constant-current-like charging can reduce the count of times that the output voltage of the DC-charging power source adaptor is adjusted, but the output voltage is constant for a period of time, and the charging current is decremented gradually with the ever rising core voltage of the battery, thus resulting in some influence upon the charging speed of the battery.

In order to enable the charging current to be maintained at a stable high level, DC-charging control by following in real time the varying core voltage is proposed in this embodiment as described in details in the following third designed approach.

In the third designed approach, the target charging voltage value is adjusted in real time by following dynamically the core voltage of the battery.

Figure 8:
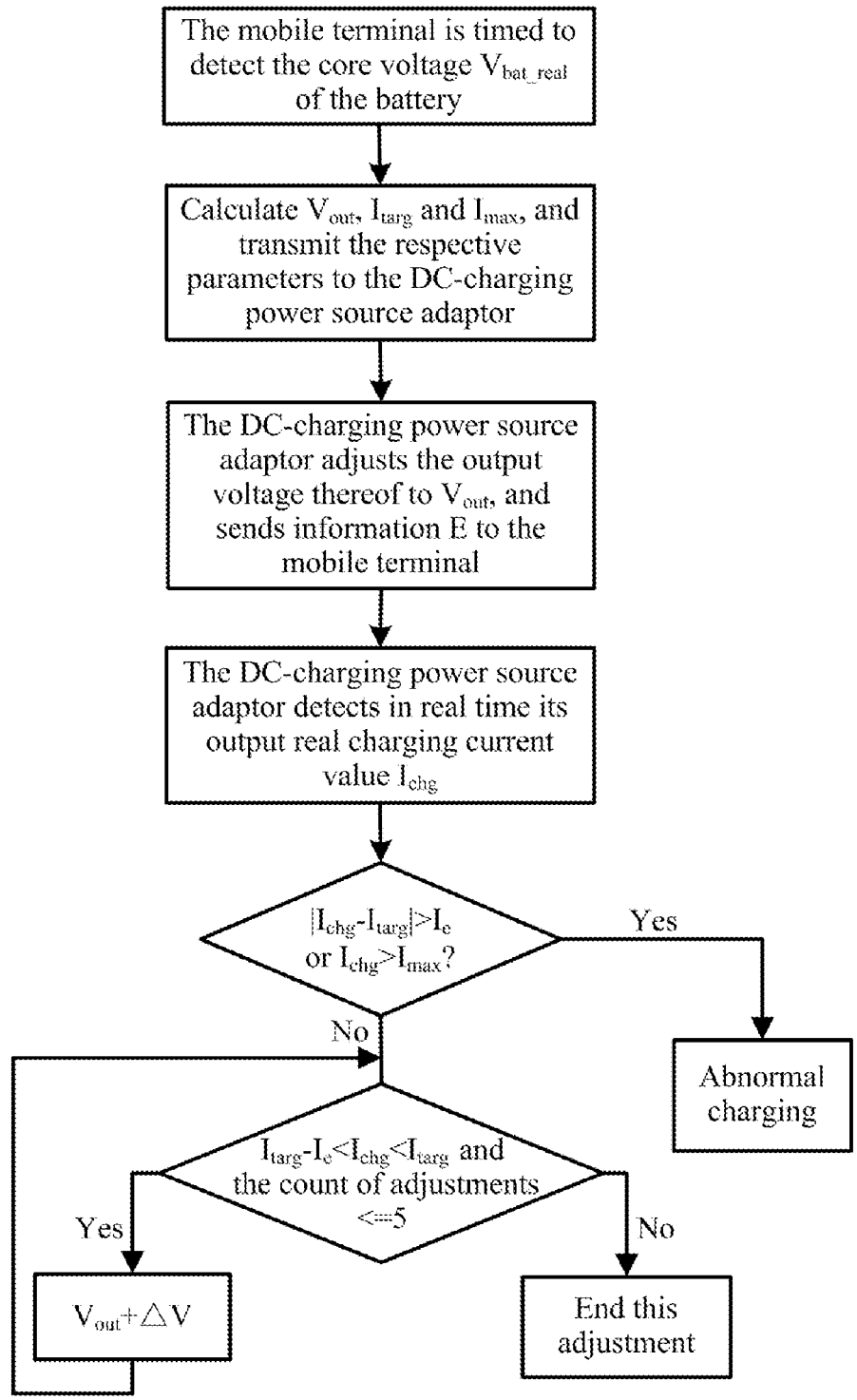
FIG. 8 is a flow chart of control in an embodiment of a voltage-following DC-charging control strategy.

As illustrated in FIG. 8, after entering the DC-charging process, the microprocessor in the mobile terminal is timed to detect the core voltage $V_{bat\_real}$ of the battery, calculates the target charging voltage value $V_{out}$, the target charging current value $I_{targ}$, and the charging current maximum value $I_{max}$ using Equations (1) to (4), and sends them to the DC-charging power source adaptor.

The DC-charging power source adaptor adjusts the resistance value of the valid resistor of the digital potentiometer thereof according to the received target charging voltage value $V_{out}$ to thereby adjust the charging voltage output by the AC-DC unit thereof to the target charging voltage value $V_{out}$. At the end of the adjusting, the DC-charging power source adaptor sends information E to the mobile terminal, and also detects the charging current $I_{chg}$ output by the DC-charging power source adaptor, through the current detecting chip, and if $|I_{chg}-I_{targ}|>I_e$ or $I_{chg}>I_{max}$, then the DC-charging power source adaptor determines abnormal charging, disconnects the charging power source from being output by the DC-charging power source adaptor to the outside, and notifies the mobile terminal of abnormal charging. If $|I_{chg}-I_{targ}|\le I_e$ and $I_{chg}\le I_{max}$, then the DC-charging power source adaptor ends this adjusting process, or starts the charging current self-adjusting algorithm above to finely adjust the charging voltage for at most five times (or another number of times), so that the real charging current value $I_{chg}$ output by the DC-charging power source adaptor approaches progressively the target charging current value $I_{targ}$ to thereby speed up charging as much as possible.

S406. The mobile terminal detects whether the core voltage of the battery exceeds the range delimited by the DC-charging thresholds, and if not, then the flow returns to the operation S405; otherwise, the flow proceeds to a subsequent operation.

S407. The microprocessor controls the DC-charging switch to be opened to disconnect the DC-charging pathway, instructs the DC-charging power source adaptor to adjust the output voltage thereof to the default constant charging voltage, e.g., 5V DC-charging voltage, and starts the power source managing chip to receive the constant charging voltage to charge the battery at the constant voltage until the battery is fully charged.

In order to ensure the safety of the mobile terminal being charged, the following charging abnormality handling mechanism is proposed in this embodiment:

1. At the mobile terminal side (1) The mobile terminal detecting that it is being powered by the DC-charging power source adaptor is timed to send a handshake instruction to the DC-charging power source adaptor, and waits for a preset period of time until the DC-charging power source adaptor feeds back response information, and if the mobile terminal receives the response information, then the handshake succeeds, and the mobile terminal is further charged; otherwise, the mobile terminal determines abnormal charging, disconnects the connection line between the charging interface of the mobile terminal and the system circuit, and notifies the user of the power source adaptor being abnormal;

(2) After entering the DC-charging process, if the mobile terminal detects that the DC-charging power source adaptor is pulled out suddenly, then it disconnects the DC-charging pathway between the charging interface of the mobile terminal and the battery, and has the charging interface connected with the power source managing chip;

(3) After entering the DC-charging process, if the mobile terminal detects that the terminal voltage of the battery exceeds the preset threshold (the threshold of the terminal voltage of the 4.2V chargeable battery can be preset to 4.6V), then it disconnects the DC-charging pathway between the charging interface of the mobile terminal and the battery, and instructs the DC-charging power source adaptor to switch to the default constant charging voltage for output, e.g., 5V DC voltage;

(4) After entering the DC-charging process, the mobile terminal detects in real time the received real charging current value $I_{chg}$, and if the absolute value of the difference between $I_{chg}$ and $I_{targ}$ goes beyond the preset controllable range of the difference, then it disconnects the DC-charging pathway between the charging interface of the mobile terminal and the battery, and switches to the power source managing chip to charge the battery; and (5) After entering the DC-charging process, the mobile terminal detects in real time the received real charging current value $I_{chg}$, and if $I_{chg}$ is more than $I_{max}$, then it disconnects the DC-charging pathway between the charging interface of the mobile terminal and the battery, and notifies the user of the power source adaptor being abnormal.

2. At the DC-charging power source adaptor side (1) The DC-charging power source adaptor obtaining the target charging voltage value $V_{out}$, the target charging current value $I_{targ}$, and the charging current maximum value $I_{max}$ detects in real time its output real charging current value $I_{chg}$, and if the absolute value of the difference between $I_{chg}$ and $I_{targ}$ goes beyond the preset controllable range of the difference, then the DC-charging power source adaptor stops outputting the charging power source, and flicks a lamp to alert the user;

(2) After entering the DC-charging process, the DC-charging power source adaptor detects in real time its output real charging current value $I_{chg}$, and if $I_{chg}$ is more than $I_{max}$, then it determines abnormal charging, and stops the charging power source from being output to avoid the mobile terminal from being damaged due to being further powered.

Advantages and beneficial effects of this disclosure lie in that in this disclosure, the strategy to identify the type of charging is designed in the mobile terminal dependent upon the configured communication pins of the different external device so that the mobile terminal identifies automatically the type of the externally connected charging device. Also the specialized rapid charging mode is designed for the DC-charging power source adaptor, and the battery being charged is DC-charged at large current to thereby significantly speed up charging of the battery so as to shorten the period of time required for charging the mobile terminal, to alleviate such an influence upon the user in a daily access to the mobile terminal that arises from the mobile terminal being frequently charged for a long period of time, and to greatly improve the satisfactory of the user with the mobile terminal.

The charging method according to this disclosure can be widely applied to a handset, a tablet computer, a notebook computer, a mobile power source, and other mobile terminals so as to satisfy different charging demands of the user.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A mobile terminal comprising:
a battery configured to store electric energy;
a USB interface configured to have an external device inserted there into, the USB interface including a pair of differential data pins;
a microprocessor configured to judge whether the pair of differential data pins of the USB interface are shorted upon detecting an external device being inserted into the USB interface, if the pair of differential data pins of the USB interface are not shorted, conduct USB communication with the inserted external device, if the USB communication fails, conduct UART communication with the inserted external device, if the UART communication succeeds, determine the inserted external device is a DC-charging power source adaptor, detect a voltage of the battery, if the voltage of the battery is in a range delimited by preset DC-charging thresholds, control a charging voltage output by the DC-charging power source adaptor to charge the battery, and determine a charging voltage value of the DC-charging power source adaptor according to the current voltage of the battery; and
a gating switch connected between the USB interface and the microprocessor, the gating switch configured to connect, by default, the pair of differential data pins with differential data interfaces of the microprocessor for USB communication between the microprocessor and the external device, wherein if the USB communication fails, the microprocessor is configured to control the gating switch to connect the pair of differential data pins of the USB interface with UART interfaces of the microprocessor for UART communication with the external device.

2. The mobile terminal according to claim 1, further comprising:
a DC-charging switch connected between the USB interface and the battery, the microprocessor configured to control the DC-charging switch to close when the voltage of the battery is in the range delimited by the preset DC-charging thresholds, to transmit the charging voltage output by the DC-charging power source adaptor directly to the battery to charge the battery; and
a power managing chip connected between the USB interface and the battery, the microprocessor configured to control the power managing chip to receive the charging voltage output by the DC-charging power source adaptor and to charge the battery when the voltage of the battery is out of the range delimited by the preset DC-charging thresholds.

3. A DC-charging power source adaptor comprising:
a charging interface configured to be externally connected with a mobile terminal, and comprising two communication pins disconnected from each other;
an AC to DC converting unit configured to convert an AC input power source into a charging voltage required by the mobile terminal, and to output the charging voltage via the charging interface;
a controlling unit connected with the charging interface, and configured to conduct UART communication with the mobile terminal through the communication pins, after the charging interface is connected with the mobile terminal, to adjust the charging voltage output by the AC to DC converting unit;
a current detecting unit configured to detect, in real time, a charging current $I_{chg}$ output via the charging interface, and feedback the charging current $I_{chg}$ to the controlling unit; and
a switch circuit connected between the AC to DC converting unit and the charging interface, wherein the controlling unit is configured to, upon detecting $I_{targ} - I_e \leq I_{chg} < I_{targ}$, control the AC to DC converting unit to progressively increase the charging voltage output by the AC to DC converting unit at a span of $\Delta V$ so that the charging current $I_{chg}$ output via the charging interface approaches a target charging current value $I_{targ}$, and control the switch circuit to disconnect a charging voltage transmission line between the AC to DC converting unit and the charging interface if it is detected that the absolute value of the difference between the charging current $I_{chg}$ and the target charging current value $I_{targ}$ is more than $I_e$ or the charging current $I_{chg}$ is more than a charging current maximum value $I_{max}$,
wherein Ie represents a controllable range of the difference between the real charging current value of the DC-charging power source adaptor and the target charging current value $I_{targ}$, and wherein the controlling unit is configured to communicate with the mobile terminal to obtain the target charging current value $I_{targ}$ and the charging current maximum value $I_{max}$, or the controlling unit is configured to search a preset reference table using a voltage of a battery sent by the mobile terminal for the target charging current value $I_{targ}$ and the charging current maximum value $I_{max}$ corresponding to the current voltage of the battery.

4. A method for charging a mobile terminal, the method comprising:

detecting, by the mobile terminal, an external device being inserted into a USB interface thereof, and judging whether a pair of differential data pins of the USB interface are shorted;
 if the pair of differential data pins of the USB interface are not shorted, conducting USB communication with the inserted external device;
 if the USB communication fails, conducting UART communication with the inserted external device;
 if the UART communication succeeds, determining the inserted external device is a DC-charging power source adaptor;
 detecting a voltage of a battery of the mobile terminal, and if the voltage of the battery is in a range delimited by preset DC-charging thresholds, charging the battery using a charging voltage output by the DC-charging power source adaptor, and determining a charging voltage value of the DC-charging power source adaptor according to the current voltage of the battery;
 if the mobile terminal determines the inserted external device is a normal power source adaptor, starting a standard DCP charging mode when the pair of differential data pins are shorted; and
 if the mobile terminal determines the inserted external device is a host, starting a standard SDP charging mode when the pair of differential data pins are not shorted and the USB communication with the inserted external device succeeds.

5. The method for charging a mobile terminal according to claim 4, wherein the voltage of the battery is a core voltage of the battery, the method further comprising at least one of the following:

searching, by the mobile terminal, a preset reference table using the detected core voltage for a target charging voltage value corresponding to an interval in which the detected core voltage lies, and sending the target charging voltage value to the DC-charging power source adaptor to determine the charging voltage value output by the DC-charging power source adaptor;
 sending, by the mobile terminal, the detected core voltage to the DC-charging power source adaptor, searching a preset reference table through the DC-charging power source adaptor for a target charging voltage value corresponding to an interval in which the detected core voltage lies, and receiving the target charging voltage output by the DC-charging power source adaptor; and
 determining, by the mobile terminal, a charging current maximum value according to a maximum terminal voltage supported by the battery and an inner resistance of the battery, determining from the charging current maximum value a target charging current value corresponding to the current core voltage, calculating a target charging voltage value based on the target charging current value, a resistance value on a charging line, a resistance value on a circuit board of the mobile terminal, and the inner resistance of the battery, and sending the target charging voltage value to the DC-charging power source adaptor to determine the charging voltage value output by the DC-charging power source adaptor.

6. The method for charging a mobile terminal according to claim 4, wherein the range delimited by the DC-charging thresholds is [S1, S2], and wherein the range delimited by the DC-charging thresholds is the same as a range of the voltage of the battery corresponding to a constant-current charging phase in the standard DCP charging mode, the method further comprising pre-charging the battery with a power source managing chip at small current if the voltage of the battery is less than S1, charging the battery with the power source managing chip at a constant voltage if the voltage of the battery is more than S2, and if the voltage of the battery is out of the range delimited by the DC-charging thresholds, instructing, by the mobile terminal, the DC-charging power source adaptor to output a constant charging voltage by default.

* * * * *